INVENTORS.
GEORGE C. FREY
THADDEUS W. STANIEC
CHARLES M. WILLIS
BY
Allay Rothenberg
ATTORNEY United States Patent Office 3,618,144
Patented Nov. 9, 1971

3,618,144
CUSHIONING ASSEMBLY
George C. Frey, Manhattan Beach, and Thaddeus W. Staniec and Charles M. Willis, Los Angeles, Calif., assignors to North American Rockwell Corporation
Filed Mar. 6, 1969, Ser. No. 804,864
Int. Cl. A47c 23/02
U.S. Cl. 5—247   18 Claims

ABSTRACT OF THE DISCLOSURE

A pad for use in cushions, mattresses chairs, or other padding arrangements, providing a soft, deformable support, having one or more layers of parallel flexible tubes; each elongated tube being partially cut or slit across the axis of the tube for controlling resiliency and flexibility. The tubes are held in mutually spaced relationship by being affixed to a sheet of flexible material.

BACKGROUND

The invention described herein was made in the performance of work under a NASA contract and is subject to the provisions of the National Aeronautics and Space Act of 1958, Public Law 85–568 (72 Stat. 426; 42 U.S.C. 2451) as amended.

There are various known arrangements of pads for supporting the body of the user, but none are capable of long term support due to the types of construction required in each case. Therefore, there are many problems in the field of body support devices for sitting as well as sleeping. As is well known in the art to which this invention relates, various forms of pads have been devised for vehicles, such as trucks, buses, automobiles, and aircraft, as well as many different variations in indoor and outdoor furniture. However, such pads have been constructed of a series of wire members in the form of springs or spring like devices made of wire which are generally covered with a suitable fabric. Due to the construction of this type of pad and after a short length of time in use, the pad device becomes worn or deteriorates due to its constant use and/or weathering. More particularly, the wire members often become distorted and lose the cushioning effect that was originally required of the device. In addition, the use of wire becomes limited in many areas were there is a critical weight problem, and therefore a pad of this type can only be considered in very limited areas.

Foam padding is also employed, but this too has its problems in areas where ventilation is necessary. Distortions due to wear cause the cushion or the like to be uncomfortable, and in addition there is a critical weight problem when used in aircraft seats and the like.

Therefore, one object of my invention is to provide a pad wherein the use is not limited to just one area and this is done by solving each of the above inherent problems of a wire spring design or the use of foam materials.

Other cushioning arrangements employ inflatable articles such as air matresses. These inflatable devices must be pressurized before they can be used. After inflation to the desired requirements, the need to maintain the pressure becomes essential and leakage becomes a problem.

It is desirable that a body supporting pad be arranged and constructed so as to improve comfort and reliability and yet be adapted to all size requirements as well as resulting in a reduction in weight and cost along with simplicity of construction. The technique used in the construction and design of body supporting structure herein described incorporates advantages that enable use in a larger and more varied field heretofore unobtainable.

BRIEF SUMMARY

In carrying out the principles of the invention in accordance with an embodiment thereof, there is provided a pad or cushioning assembly to be used to support the human body either in a sitting position or a prone position as is normally used in conjunction with a mattress. The pad comprises a plurality of parallel tubular members of a flexible material evenly spaced in a side-by-side relationship. The tubular members are held in place by sewing, gluing, or adhesive bonding to a sheet of flexible material. Smaller diameter tubes are positioned within the larger tubes. To control sideward movement of the larger tubes, as well as limiting separation between each tube, flexible strips are secured to mutually facing outer surfaces of adjacent tubes.

Resiliency of both inner and outer tubes is controlled by transverse cuts or slits made in the tube, axially spaced along each tube.

Thus, the controlling factors for firmness, resiliency comfort, and weight support are governed by the diameters, wall thicknesses, and materials of the inner and outer tubes, the number, spacing and width of the cuts and the materials and thickness of the connecting strips. Configuration materials, pad thickness and resiliency all may be readily varied in manufacture, depending on the intended use of the pad. Although, in the following paragraphs the cushion assembly is described, for ease of explanation, as being constructed of a number of individual parts, it is to be understood that a more economical method of manufacturing, such as, an extrusion process may be employed. In addition, an extrusion type process lends itself to the use of such preferred materials as vinyl, polyurethane and neoprene. Accordingly, when different elements of the illustrated structure are described as secured or adhesively bonded to one another it will be readily understood that these descriptive terms also include an extruded arrangement wherein various adjoining elements are in fact integral with each other.

Other characteristics, advantages, and objects of the invention, will be more readily appreciated from the following description when taken in connection with the accompanying drawings wherein.

DETAILED DESCRIPTION

Figure 1:
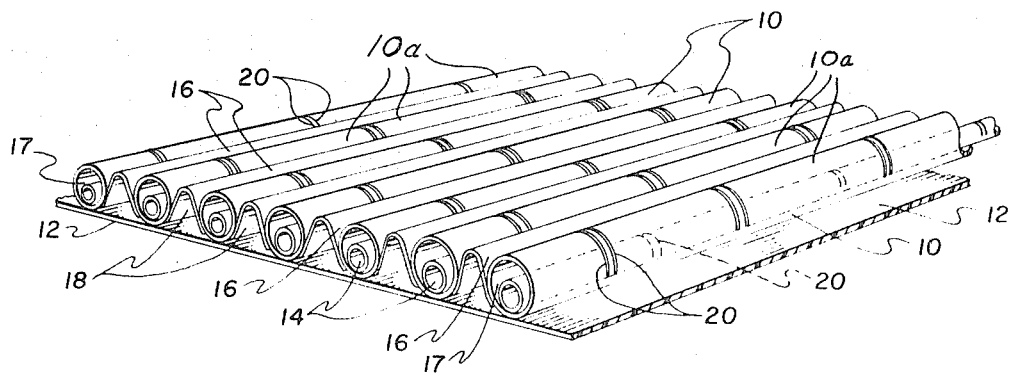
FIG. 1 is a perspective view of one embodiment of my invention.
Figure 2:
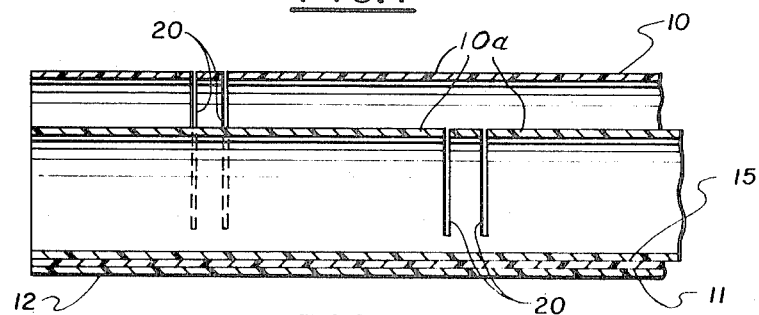
FIG. 2 is a section view on line 2—2 of FIG. 3.
Figure 3:
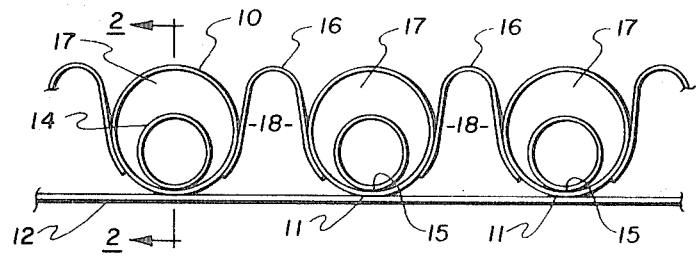
FIG. 3 is a partial end view of the embodiment of FIG. 1.

Referring to the drawings in detail wherein like reference numerals are used throughout to denote like parts, and in more particular to FIGS. 1 through 3, a first embodiment of my invention includes a plurality of elongated parallel tubular members 10 of a continuous resilient plastic material. Each tubular member 10 is evenly spaced in juxtaposed relationship with adjacent members and secured at 11 as by suitable adhesive or the like to a flexible sheet material 12 whereby the tubes 10 may be held in parallel alignment throughout the entire length thereof. An additional group of smaller flexible tubular members 14 are interposed within and along desired portions or the entire length of the larger tubular members 10. The small tubes 14 are secured at 15 by an adhesive bonding to the lower portion of the internal wall of the larger tubes 10. It should be noted that other means for securing the tubular members can be used, such as sewing, or vulcanizing, where rubber is employed as a tube coating or in the tube body. The larger tubes 10 are eccentric to the smaller diameter tubes 14 and thereby form a void or controlled space 17. Therefore, it can be seen that the relative size of the tubes is one of the controlling factors in the adjustment of the degree of firmness required for a particular item that might be produced. Other controlling factors will be hereinafter described.

In order to regulate lateral movement, as well as to control and limit separation between each tubular member 10, a flexible strip preferably consisting of a plastic material is secured to each pair of adjacent tubes. The strip 16 has an inverted U-shaped configuration and is positioned between the adjacent tubular members 10. Strip 16 is attached, as by continuous adhesive bonding along the full length of each of its edges to the adjacent external surface of the larger diameter tubes 10. This strip supplements the support provided by the tubes and forms an arch in the spaces or channels 18 between the parallel tubes. In addition, the spaces or channels 18 between the tubes 10 allow each tube to work individually, whereby contact between each adjacent tube surface does not occur when the tubes are deformed by compression.

In order to regulate the degree of resiliency and flexibility of both the large tubular members 10 and the small tubes 14, there has been incorporated a means for establishing flexibility of both tubular members in the manufacture of the assembly. This means comprises a multiplicity of interruptions. These interruptions are shown as cuts or slits 20 which extend transversely of the axis of the tubes and are formed at spaced intervals along the length of the tubes. However, it is to be understood that other means of interruption may be used to weaken predetermined areas. These means could also include thinned wall surface areas, as well as aligned holes, placed about the circumference of the tubular members. The cuts or slits 20 are preferably cut to a depth of at least half of the diameter of the tubes. For ease of manufacture, handling and assembly, the slits are preferably extended for less than the full tube diameter, whereby each tube is substantially a single element for its entire length, which is substantially co-extensive with one dimension of the cushioning assembly. The depth of the cuts 20 as well as the position and number of cuts along the tubing regulate the degree of firmness that might be required by a cushion or mattress.

The interruptions along a tubular member are longitudinally spaced whereby selected portions 10a are sequentially arranged. These portions or sections 10a can be divided up into many small segments or a few larger segments depending on the need. In addition, as can be seen in the drawing, one slit or a group of two or more may be arranged in a series, whereby each segment 10a of a tubular member is clearly defined. Therefore each segment will act independently of each adjacent segment, that is, if pressure is applied to one area of the support structure, the entire tubular members will not collapse, only an individual segmented portion will be affected. As illustrated in FIGS. 1 and 2 the slits in outer tube 10 are staggered longitudinally with respect to the slits in inner tube 14 in order to more clearly show the arrangement of the slits on each tube. It should be understood, however, that the slits 20 may be aligned if desired, that is, the cuts of the larger tubes are arranged above the cuts of the smaller tubes, rather than being staggered as shown. The alignment of the slits 20 between both the larger tubes 10 and the smaller tubes 14 facilitate ease of manufacturing of the pad, whereby one cutting operation would be necessary. The construction of the embodiment as shown in FIGS. 1 through 3 may be enclosed within an envelope type of enclosure or covering. However, such is not required for the operational use of the invention and, therefore, is not shown so that the detail construction of the device can more readily be understood.

Figure 4:
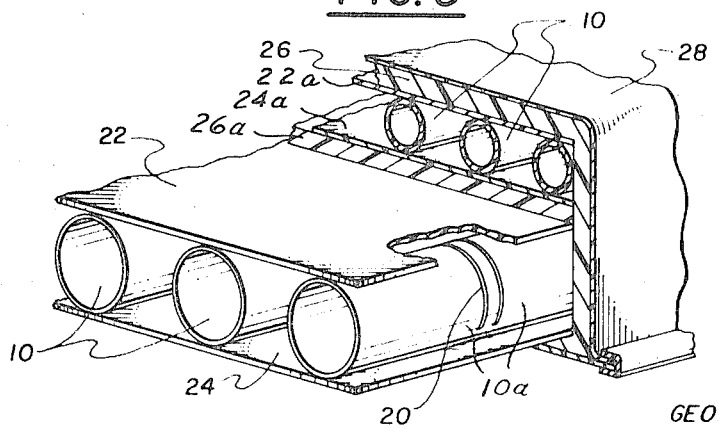
FIG. 4 is a partial perspective view of another embodiment of my invention.

The arrangement as shown in FIG. 4 comprises an upper and lower group or layer of parallel tubular members 10. The tubes of upper and lower layers in the embodiment of FIG. 4 have their axes oriented in parallel directions to one another, but it is to be understood that tubes of either the upper or lower layers may be oriented in any relationship to each other or to the overall cushioning assembly depending on the needs and requirements of the item to be made. Preferably, axes of tubes in any one layer are all parallel.

Since the upper and lower layers of flexible tubes are the same, an explanation of one group will suffice. In order to retain an equally spaced orientation of the tubular members to each other, a sandwich type construction is used. This sandwich structure includes two flexible sheets 22 and 24, preferably plastic in composition, which are secured to upper and lower portions of the tubular members 10. The securing of the sheet material 22 and 24 to the tubes is preferably accomplished by adhesive bonding. Where the requirement presents itself it is contemplated that smaller diameter tubes can be employed in the same manner as previously described herein.

As appears in FIG. 4 the group of tubular members are supported in an enclosure comprising a filler material 26 which could be of any known type such as felt, cotton, and foam. If deemed necessary or desirable a layer of filler 26a is also interposed between upper facing sheet 22 of the lower layer of tubes and lower sheet 24a of the upper layer of tubes. Material 26 is in turn covered with a fabric 28 which may be formed of any suitable woven or yieldable material that would suit a particular use of the item. Although, the cushion assemblies are shown supported in an enclosing envelope 28, it should be understood that each assembly may be used individually and without the additional envelope as shown in FIG. 4. Therefore, when an assembly is used independent from other materials the face sheet 22 acquires a dual function. Not only is the face sheet used as a means for retaining the tubular members 10 in a predetermined spatial relationship with respect to each other, but becomes in addition, a protective enclosure cover. Under this condition the upper face sheet 22a and the lower sheet 24 are extended whereby they are secured to each other forming a single complete enclosure. When this type of construction is employed various designs and patterns may be utilized on the surface of sheets 22a and 24 respectively.

In a modified arrangement of the embodiment of FIG. 4, intermediate layers 22, 24a and 26a may be omitted, with the two layers of tubes bonded to each other at their inwardly facing sides and to the exterior sheets 24 and 22a respectively at their outwardly facing sides.

A variety of plastic materials such as neoprenes, polyurethanes, vinyls and other plastics having known resiliencies and elasticities, in thicknesses selected for a desired performance, may be most economically employed in manufacture of the described cushioning assembly by means of conventional extrusion processes. It is well known that almost any cross-sectional configuration, including that illustrated in FIG. 3 may be created in desired lengths by standard extrusion techniques. For the completed cushioning assembly, there is added to the partial structures of FIGS. 1, 2 and 3 the final upper sheet with or without the intermediate cushioning element 26 of FIG. 4. The manufacturing process of the complete assembly takes place in several steps. First there is extruded from suitable type and wall thickness of chosen plastic a cross-sectional configuration of desired length of the shape illustrated in FIG. 3. The extrusion cannot include the upper sheet if the transverse slits 20 are employed. Accordingly after extrusion of desired lengths of partial assemblies, such as illustrated in FIGS. 1 and 3, a cutting operation is performed to provide transverse slits 20, which in one operation can penetrate, for example, through more than half of the diameter of the larger diameter tube and through a minimum of half of the diameter of the smaller diameter inner tube. If deemed necessary or desirable or more convenient for manufacturing processes, the interconnecting strips 16 may also be provided with slits (not shown) or a partial slit may be formed in strips 16 during the operation by which the large diameter tubes 10 are slit. It will be readily appreciated from inspection of the cross section of FIG. 3 that a slitting operation that penetrates the large diameter tube 10 for more than half of its diameter would necessarily impart a slit to the interconnecting strip 16.

After the provision of the slits in any desired depth and pattern on the extruded sub-assembly, an upper facing sheet, such as sheet 22 of FIG. 4, may be suitably affixed as by adhesive bonding, or the like, in tangential engagement with the upper surface portions of the larger tubes 10 and the interconnecting strips 16. In some arrangements it may be desirable to maintain the strips 16 free of the upper facing sheet 22. In such case the strips 16 will be positioned and sized so that the upper portion thereof is below the upper portion of the large diameter tube 10 whereby the upper facing sheet 22 may be conveniently secured solely to the large tubes 10.

Functionally, the invention must yield somewhat to conform to the body shape of the user, but must be sufficiently rigid that it will not totally collapse in use. This invention provides a relatively soft deformable support to the user which will yield under steady pressure of normal use while at the same time provide an essentially rigid unyielding support under the rapidly applied load. Therefore the requirements for resiliency or yieldability are controlled by many factors in this invention, including the size of the tubes, the thickness of the tube walls, and the number and placing of the slits 20. These controls are dictated by the requirements of the use and the user.

What is claimed is:

1. Cushioning apparatus comprising:
   a plurality of flexible tubular members each having at least one complete circumferential transverse cross-section and at least some of which have longitudinally spaced transverse slits in the upper portion thereof extending to a depth of at least half the diameter of said tubular members but less than the full diameter of said tubular members thereby dividing each of said tubular members into individual deformable tubular segments; and
   means for retaining said tubular members in a predetermined spatial relation with respect to each other wherein a controllably deformable cushioning apparatus is provided having each individual segment of said flexible tubular members deformable independently of any other segment.

2. The apparatus of claim 1 wherein said means comprises a substantially continuous flexible sheet affixed to at least some of said tubular members, and wherein said tubular members are substantially parallel to and transversely spaced from each other.

3. Cushioning apparatus comprising:
   a plurality of tubular members at least some of which have longitudinally spaced transverse slits, said tubular members being substantially parallel to and transversely spaced from each other;
   a substantially continuous sheet affixed to said tubular members for retaining said tubular members in a predetermined parallel spatial relation with respect to each other; and
   additional retaining means comprising a plurality of resilient strips, each located between a pair of adjacent tubular members and each including first and second opposite edge portions affixed to respective mutually facing sides of adjacent tubular members.

4. The apparatus of claim 3 wherein said tubular members are each of substantially equal dimensions in transverse section, and at least some of said members include a tubular member of smaller transverse sectional dimensions carried within and secured to the first mentioned tubular member, and at least some of said smaller diameter tubular members having a plurality of longitudinally spaced transverse slits.

5. The apparatus of claim 4 wherein said tubular members, strips and sheet comprise an extrusion.

6. A cushioning structure comprising:
   a flexible base supporting sheet;
   a plurality of individual resilient thin-wall tubular members attached to said base sheet in parallel side by side relationship to each other, each of said tubular members having an axial length greater than its transverse width and at least one complete circumferential transverse cross-section;
   means for providing controlled flexibility of individual portions of some of said tubular members comprising a multiplicity of interruptions longitudinally spaced along the upper portion of said some tubular members thereby defining individually deformable axially extending portions of said some members; and
   means for limiting separation between said tubular members, said separation limiting means being attached to said tubular members along the outer surface thereof.

7. A cushioning structure as defined in claim 6, wherein said interruptions comprise a multiplicity of slits arranged transversely of said tubular members.

8. A cushioning structure as recited in claim 7 wherein said means for limiting separation between said tubular members comprises a flexible flat sheet overlying all of said tubular members and secured thereto.

9. A cushioning structure as recited in claim 6, wherein said means for limiting separation between said tubular members comprises a plurality of flexible strips positioned between each of said tubular members and secured to the outer surface thereof.

10. A cushioning structure as recited in claim 9, wherein each of said flexible strips has an inverted substantially U-shaped configuration, each free end thereof being secured to the outer lower portion of adjacent parallel tubular members.

11. A cushioning structure comprising:
    a base supporting flexible sheet;
    a first group of individual continuous resilient tubular members secured to said base sheet in parallel side by side relationship to each other;
    a second group of resilient tubular members having a reduced diameter in relationship to said first group of tubular members, each member of said second group of tubular members being positioned within a corresponding one of said group of tubular members and secured to the internal surface thereof; and
    means attached to said first group of members along the outer surface thereof for limiting separation between members of said first group of members.

12. A cushioning structure as recited in claim 11 including means for establishing flexibility of both first and second groups of tubular members, said last mentioned means comprising a multiplicity of longitudinally spaced transverse slits in said members.

13. A cushioning structure comprising:
    a first layer of tubular members, said members being parallel to and transversely spaced from each other;
    a substantially continuous lower base sheet, said base sheet being secured to said first layer of tubular members;
    an upper substantially continuous face sheet overlying all of said first layer of tubular members and secured thereto;
    a second layer of tubular members, said members being parallel and transversely spaced from each other, and superposed upon said first layer;

a second substantially continuous lower base sheet, said second base sheet being secured to said second layer of tubular members;

a second upper substantially continuous face sheet overlying all of said second layer of tubular members; and a filler layer interposed between said upper face sheet of said first layer of tubular members and said lower base sheet of said second layer of tubular members.

14. The apparatus of claim 13, including a filler member encompassing said first and second layers of tubular members; and an envelope enclosing both of said first and second layers of tubular members and said filler member.

15. The apparatus of claim 13, wherein at least some of said tubular members have longitudinally spaced transverse slits.

16. A cushioning assembly comprising:

a base member;

a plurality of first flexible elongated tubular members secured to said base member in a predetermined spatial relation with respect to each other, each of said tubular members having at least one complete circumferential transverse cross section; and one or more second elongated tubular members of smaller transverse dimensions than said first elongated tubular members secured within one or more of said first flexible elongated tubular members.

17. The cushioning assembly of claim 16 wherein at least some of said elongated tubular members contain longitudinally spaced transverse slits.

18. The cushioning assembly of claim 17 and further including resilient retaining means located between and secured to a pair of adjacent first tubular members.

References Cited

UNITED STATES PATENTS

| | | | |
|---|---|---|---|
| 18,630 | 11/1957 | Colton | 5—247 X |
| 3,048,514 | 8/1962 | Bentele et al. | 5—349 X |
| 3,167,353 | 1/1965 | Crane | 5—347 X |

BOBBY R. GAY, Primary Examiner

A. M. CALVERT, Assistant Examiner

U.S. Cl. X.R.

5—345; 267—142